United States Patent
Tak et al.

(10) Patent No.: US 7,995,065 B2
(45) Date of Patent: Aug. 9, 2011

(54) ANIMATION REPRODUCING APPARATUS AND METHOD

(75) Inventors: Seyoon Tak, Yongin-si (KR); Dokyoon Kim, Seongnam-si (KR); Keechang Lee, Yongin-si (KR); Jeonghwan Ahn, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 855 days.

(21) Appl. No.: 11/525,038

(22) Filed: Sep. 22, 2006

(65) Prior Publication Data
US 2007/0109305 A1    May 17, 2007

Related U.S. Application Data

(60) Provisional application No. 60/719,562, filed on Sep. 23, 2005.

(30) Foreign Application Priority Data

May 2, 2006    (KR) .................... 10-2006-0039553

(51) Int. Cl.
*G06T 15/70* (2006.01)

(52) U.S. Cl. ......... 345/473; 345/474; 345/475; 711/170

(58) Field of Classification Search ................. 345/473, 345/474, 475
See application file for complete search history.

(56) References Cited

U.S. PATENT DOCUMENTS

| 5,877,778 | A | * | 3/1999 | Dow et al. ............. | 345/474 |
| 6,173,381 | B1 | * | 1/2001 | Dye .................... | 711/170 |
| 6,359,621 | B1 | * | 3/2002 | Maeda et al. .......... | 345/473 |
| 6,535,215 | B1 | * | 3/2003 | DeWitt et al. ......... | 345/473 |
| 2001/0048441 | A1 | * | 12/2001 | Mochizuki et al. ...... | 345/475 |

FOREIGN PATENT DOCUMENTS

KR    10-2004-0087787    10/2004

OTHER PUBLICATIONS

Stephane Menardais, Franck Multon, Richard Kulpa, Bruno Arnaldi, "Motion Blending for Real-Time Animation while Accounting for the Environment," 2004, Computer Graphics International 2004 (CGI'04), pp. 156-159.*
Autodesk® 3ds Max® of Discreet company, "Autodesk—Media & Entertainment Solutions", [Online], Printed on Sep. 22, 2006, 2pp Web URL: <http://www.discreet.com> and <http://use.autodesk.com/adsk/servlet/index?siteID=123112&id=6397712>.
"Constrained Framespace Interpolation", Golam Ashraf & Kok Cheong Wong, Proceedings of The Fourteenth Conference on Computer Animation, Nov. 7, 2001, pp. 61-72.
Korean Office Action issued May 25, 2007 in corresponding Korean Patent Application No. 10-2006-0039553.

* cited by examiner

*Primary Examiner* — Kimbinh T Nguyen
(74) *Attorney, Agent, or Firm* — Staas & Halsey LLP

(57) ABSTRACT

An animation reproducing apparatus and method of reproducing an animation reproduces an animation of a predetermined model. The animation reproducing apparatus includes a motion blending unit blending one or more previously prepared animations according to a desired motion that is to be reproduced and a rendering unit rendering a result of the blending.

19 Claims, 6 Drawing Sheets

ANIMATION REPRODUCING APPARATUS AND METHOD

CROSS-REFERENCE TO RELATED APPLICATIONS

This application claims the benefit of U.S. Provisional Patent Application No. 60/719,562, filed on Sep. 23, 2005, in the U.S. patent and Trademark Office, and Korean Patent Application No. 10-2006-0039553, filed on May 2, 2006, in the Korean Intellectual Property Office, the disclosure of which is incorporated herein in its entirety by reference.

BACKGROUND OF THE INVENTION

1. Field of the Invention

The present invention relates to animation reproduction, and more particularly, to an animation reproducing method and apparatus for generating and reproducing an animation corresponding to a desired motion by blending one or more previously provided animations according to the motion even when the animation representing the desired motion is not previously provided.

2. Description of the Related Art

When a user plays a 3-dimensional (3D) graphic game using a personal computer (PC), animation data is usually prepared in the PC for each model and each motion beforehand. For example, if a motion of a model M having a human shape is controlled by a user on a journey to a specific destination in the game, two kinds of animation data m1 and m2 of the model M may be prepared in the PC beforehand, where m1 is an animation representing a running figure of model M, and $m_2$ is an animation representing a walking figure of model M.

In this case, a user decides what kind of animation data will be reproduced by manipulating keys provided in the PC. For example, if a user instructs the PC to reproduce a running figure m1 of the model M, by manipulating the keys while the animation data of the walking figure m2 is being reproduced, the PC starts to reproduce the animation data of the running figure m1.

When the animation data to be reproduced is changed in the conventional animation reproducing apparatus as described above, a user may visually recognize that the motion of the model M is discontinuous and changes in an unnatural manner. As a result, the conventional animation reproducing apparatus has a problem in that the motion is unnatural when the kind of animation data to be reproduced is changed. Moreover, such a problem becomes more serious as the number of kinds of animation data that have been previously prepared is small.

SUMMARY OF THE INVENTION

Additional aspects and/or advantages of the invention will be set forth in part in the description which follows and, in part, will be apparent from the description, or may be learned by practice of the invention.

The present invention provides an animation reproducing apparatus for generating and reproducing an animation corresponding to a desired motion by blending one or more previously provided animations according to the desired motion, even when the animation representing the desired motion is not previously provided.

Also, the present invention provides an animation reproducing method for generating and reproducing an animation corresponding to a desired motion by blending one or more previously provided animations according to the desired motion, even when the animation representing the desired motion is not previously provided.

Also, the present invention provides a computer-readable medium having embodied thereon a computer program for causing a computer to execute an animation reproducing method for generating and reproducing an animation corresponding to a desired motion by blending one or more previously provided animations according to the desired motion, even when the animation representing the desired motion is not previously provided.

According to an aspect of the present invention, there is provided an animation reproducing apparatus for reproducing an animation of a predetermined model, the animation reproducing apparatus including a motion blending unit blending one or more previously prepared animations according to a desired motion that is to be reproduced; and a rendering unit rendering a result of the blending.

According to another aspect of the present invention, there is provided an animation reproducing method for reproducing an animation of a predetermined model, the animation reproducing method including: blending one or more previously prepared animations according to a desired motion that is to be reproduced; and rendering a result of the blending.

According to another aspect of the present invention, there is provided a computer-readable medium having embodied thereon a computer program for causing a computer to execute an animation reproducing method for reproducing an animation of a predetermined model, the animation reproducing method comprising: blending one or more previously prepared animations according to a desired motion; and rendering a result of the blending.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
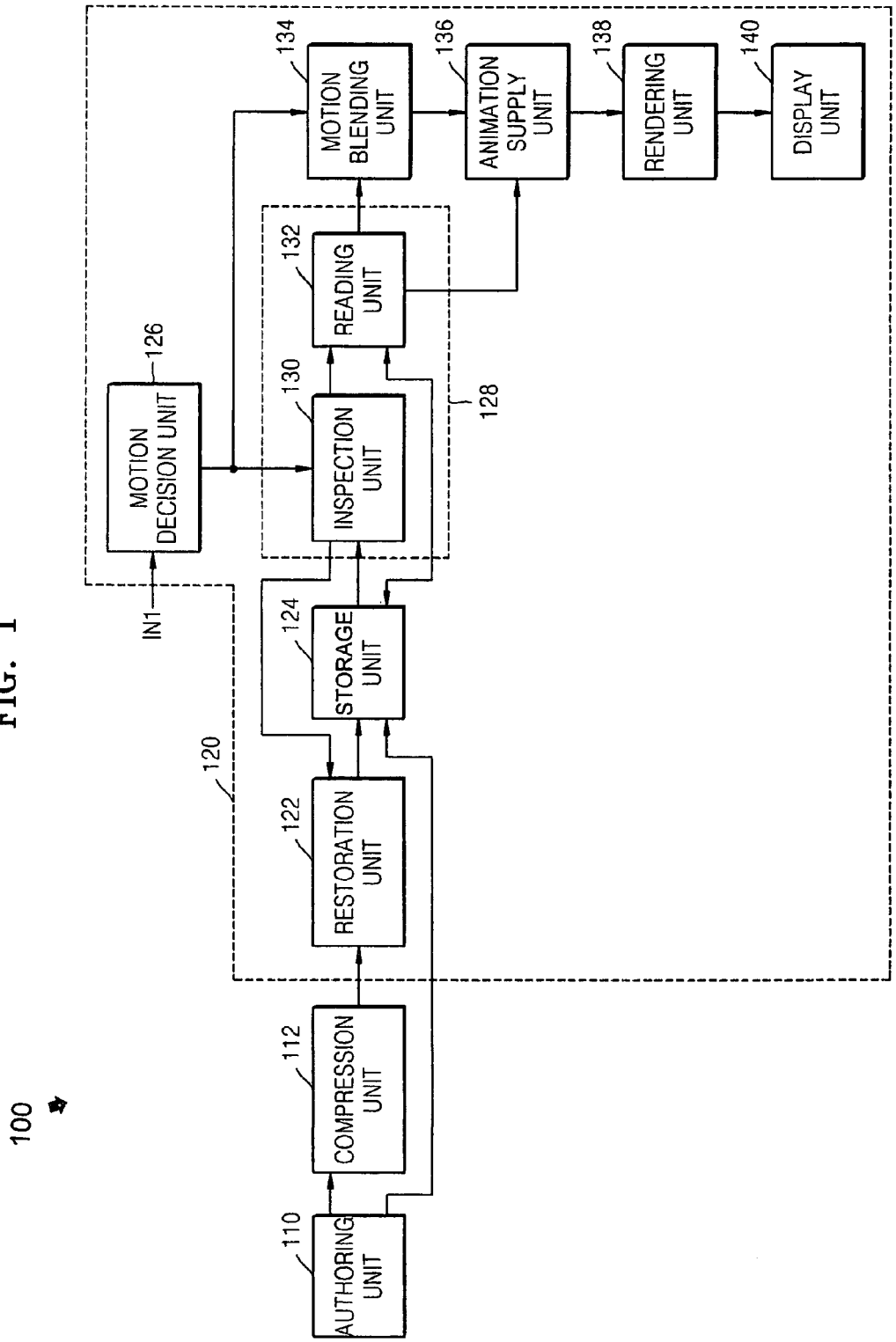
FIG. 1 is a block diagram illustrating an animation reproducing apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, an animation reproducing apparatus and method according to an embodiment of the present invention will be described in detail with reference to the accompanying drawings.

FIG. 1 is a block diagram illustrating an animation reproducing apparatus according to an embodiment of the present invention. The animation reproducing apparatus 100 includes an authoring unit 110, a compression unit 112, and an animation reproduction unit 120.

The authoring unit 110 creates various kinds of animation data. Hereinafter, animation refers to animation data. The animation may be two-dimensional (2D) or three-dimensional (3D). Preferably, the animation is three-dimensional. Various creation tools capable of creating a 3D animation may function as an implementation of the authoring unit 110. The animation data can be expressed as a time-varying function.

The authoring unit 110 authors an animation for each model and each motion. Models may be arbitrarily selected from organic or inorganic objects, such as a human being or a vehicle. For convenience of description, it is assumed that the authoring unit 110 authors animations for representing running and walking figures of each model A and B, where both models A and B are human beings. Specifically, the authoring unit 110 creates four animations a1, a2, b1, and b2 for modeling four figures, wherein the animation a1 is an animation representing a running figure of model A, the animation data a2 is an animation representing a walking figure of model A, the animation data b1 is an animation representing a running figure of model B, and the animation data b2 is an animation representing a walking figure of model B.

Figure 2A:
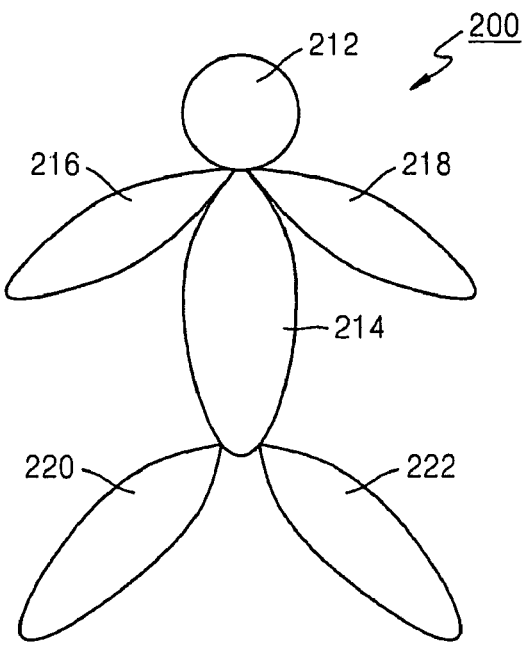
FIGS. 2A to 2D are schematic diagrams for describing operations of the creation unit illustrated in FIG. 1.
Figure 2B:
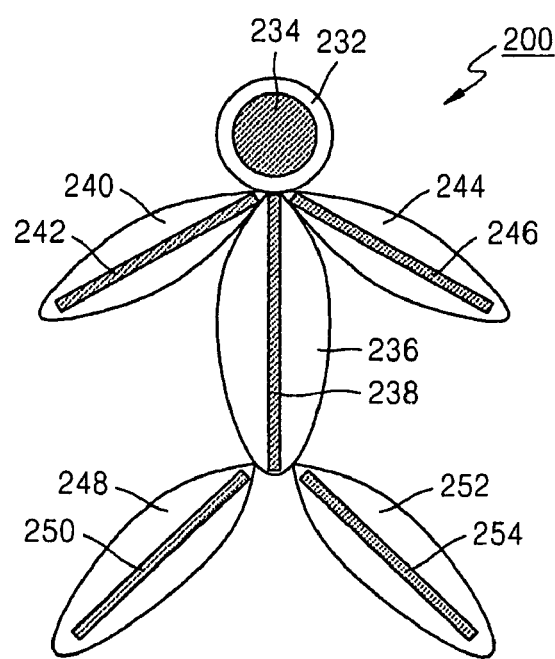
Figure 2C:
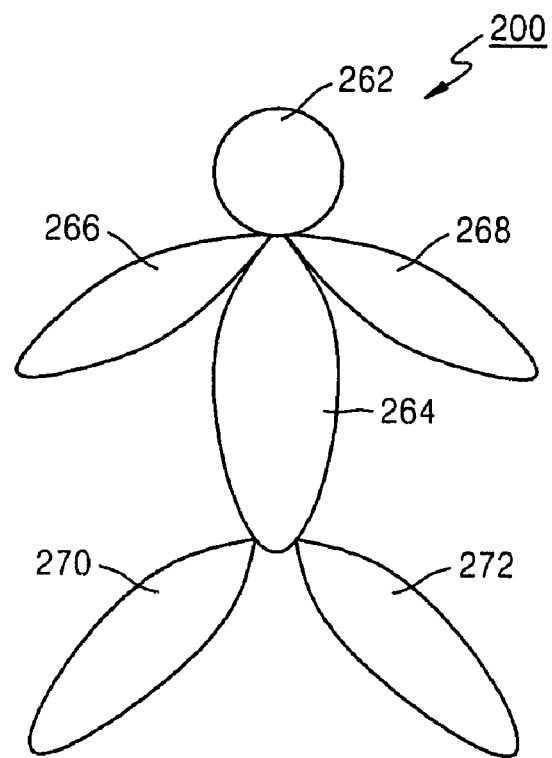
Figure 2D:
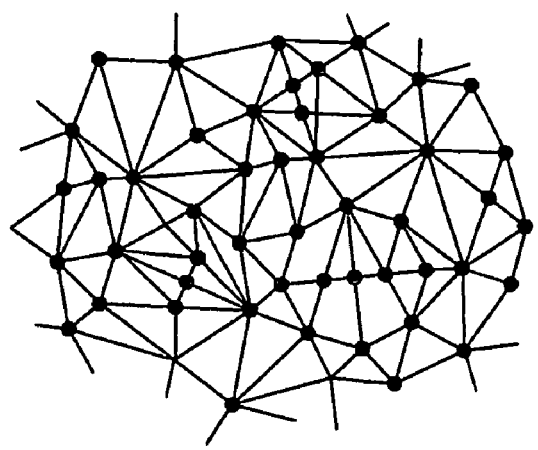

The authoring unit 110 can create various kinds of animations. For example, the authoring unit 110 may create a rigid body animation, a skin/bone animation, or a morphing animation. FIGS. 2A to 2D are schematic diagrams for describing operations of the authoring unit 110 illustrated in FIG. 1. Specifically, FIG. 2A illustrates an example of a displayed rigid body animation, FIG. 2B illustrates an example of a displayed skin/bone animation, FIG. 2C illustrates an example of a displayed morphing animation, and FIG. 2D illustrates vertexes included in the appearance of the rigid body animation, the skin/bone animation, and the morphing animation.

In the rigid body animation, a model 200 is expressed by one or more rigid bodies. In other words, each part of the model 200 is expressed by a rigid body. Therefore, a displayed shape in the rigid body animation cannot have deformation, and locations of the vertexes included in the shape of the model 200 are fixed with respect to a predetermined reference point. Specifically, locations of the vertexes included in the shape of each part of the model 200 are fixed with respect to a predetermined reference point, for example, a center of gravity, of each part. Accordingly, the authoring unit 110 is adapted so as to create information on predetermined reference points of each part of the model 200 and locations of the vertexes with respect to the predetermined reference points. In this case, the information on the predetermined reference points may be changed as time progresses while the information on the locations of the vertexes with respect to the predetermined reference points always remains constant. Referring to FIG. 2A, the model 200 is a human being having a head 212, a trunk 214, a left arm 216, a right arm 218, a left leg 220, and a right leg 222. The shape of each part includes a plurality of vertexes. The vertexes may constitute a plurality of polygons such as a triangle. As shown in FIG. 2A, locations of the vertexes included in the shape of the head 212 are fixed with respect to a predetermined reference point, for example, a center of gravity of the head 212. This can be similarly applied to the trunk 214, the left arm 216, the right arm 218, the left leg 220, and the right leg 222. Furthermore, relative positions of each part of the model 200 are also fixed. For example, a relative position of the head 212 with respect to the trunk 214 is always fixed.

In the skin/bone animation, it is supposed that each part of the model 200 includes a certain skeleton system such as bones, and movement of each part depends on movement of the bone associated with that part. The shape of the model 200, i.e., locations of the vertexes of the skin depends on the movement of the bone. Specifically, locations of the vertexes included in the shape of each part of the model 200 depend on the movement of the bone of each part. Therefore, the authoring unit 110 for creating the skin/bone animation creates information on the location and orientation of the bone for each part of the model and locations of the vertexes relative to the bone. In this case, information on the location and orientation of the bone can be changed as time progresses, while information on the locations of the vertexes relative to the bone is always constant. Referring to FIG. 2b, the model 200 includes a head 232, a trunk 236, a left arm 240, a right arm 244, a left leg 248, and a right leg 252. The shape of each part includes a plurality of vertexes. Each part 232, 236, 240, 244, 248, or 252 includes a bone 234, 238, 242, 246, 250, or 254, respectively. As shown in FIG. 2B, locations of the vertexes included in the shape of the head 232 depend on the movement of the bone 234 included in the head 232. However, the locations of the vertexes included in the shape of the head 232 are fixed with respect to the bone 234 of the head 232. The locations of the vertexes included in the shape of each of the parts 236, 240, 244, 248 and 252 depend on the movement of each of the bones 234, 238, 242, 246, 250, or 254 for each respective part 236, 240, 244, 248 and 252, and the locations of the vertexes included in the shape of the part 236, 240, 244, 248 and 252 are fixed with respect to the bones 34, 238, 242, 246, 250, or 254 of each respective part 236, 240, 244, 248 and 252.

In the morphing animation, every single vertex included in the shape of the model 200 is defined. Therefore, the authoring unit 110 for creating the morphing animation creates information on the locations of every single vertex included in the shape of the model 200. In this case, information on the location of each of the vertexes included in the shape of the model 200 may be changed as time progresses. Referring to FIG. 2C, the model 200 includes a head 262, a trunk 264, a left arm 266, a right arm 268, a left leg 270, and a right leg 272. In this case, the authoring unit 110 defines all the locations of the vertexes included in the shape of each part 262, 264, 266, 270, and 272 as a time-varying function.

The compression unit 112 compresses the animation and outputs the result of the compression to the animation reproduction unit 120. For example, a file resulting from the compression may have an extension ".sab".

The animation reproduction unit 120 reproduces the animation. The animation reproducing apparatus according to the present invention is implemented by the animation reproduction unit 120. The animation reproduction unit 120 includes a restoration unit 122, a storage unit 124, a motion decision unit 126, a search unit 128, a motion blending unit 134, an animation supply unit 136, a rendering unit 138, and a display unit 140.

The animation reproduced by the animation reproduction unit 120 may be the rigid body animation, the skin/bone animation, or the morphing animation.

The animation reproduced by the animation reproduction unit 120 does not contain only one kind of content that has been initially set, for example, as in a movie or a live concert video. The animation reproduced by the animation reproduction unit 120 is an animation decided according to the result of the key manipulation of a user. For example, if a user instructs by key manipulation that the animation b2 is to be reproduced while the animation reproduction unit 120 is reproducing the animation b1 of the model B, the animation reproduction unit 120 starts to reproduce the animation b2. In this case, the animation reproduction unit 120 does not reproduce the animation b2 just after the animation b1, but generates an intermediate animation b1' by blending the animations b1 and b2 in order to gradually change from a walking figure to a running figure. Thus, the original animations b1 and b2 are reflected in the intermediate animation b1' by predetermined proportions. The animation reproduction unit 120 generates and reproduces the intermediate animation b1' in such a way that the proportion of the original animation b1 reflected in the intermediate animation b1' is gradually reduced as time progresses. Accordingly, the animation reproduction unit 120 starts to reproduce the animation b2 when the proportion of the original animation b1 reflected in the intermediate animation b1' becomes 0%. Operations of the animation reproduction unit 120 will be described below in more detail by exemplifying operations of the restoration unit 122 through the display unit 140, particularly, through the motion blending unit 134.

The restoration unit 122 restores the compressed animation input from the compression unit 112. For example, a file having an extension ".m3d" would be a result of the restoration. One or more compressed animations may be input to the restoration unit 122 in a sequential manner one by one, or a set of compressed animations may be simultaneously input together.

The storage unit 124 temporarily stores the restored animation, and may function as a type of cache. Specifically, an animation that has been previously restored at least one time is stored in the storage unit 124. As a result, it is not necessary for the restoration unit 122 to repeatedly restore the animation that has been previously restored.

A compressed or uncompressed animation may be provided to the animation reproduction unit 120. In other words, the animation created by the authoring unit 110 may be provided to the animation reproduction unit 120 via the compression unit 112 or without passing through the compression unit 112. Even when the uncompressed animation is provided to the animation reproduction unit 120, the storage unit 124 stores the animation.

The motion decision unit 126 decides the desired motion to be reproduced by the animation reproduction unit 120 according to the result of the key manipulation input through the input terminal IN1. In this case, the key manipulation input functions as an interface capable of reflecting a user's intention as an electrical signal. For example, when a computing device, such as a personal computer (PC), is provided with the animation reproduction unit 120, keypads on a keyboard provided with the PC, a wired or wireless mouse connected to the PC, a joystick wired or wirelessly connected to the PC, or a touch screen provided in the PC may function as the interface The decided motion may be selected from those represented by one or more animations that have been previously prepared, or may be selected from motions other than those represented by one or more of the previously-provided animations. For example, the decided motion may be one of a walking and a running motion, or a mixture of a walking and a running motion having proportions of 20%: 80%.

The motion decision unit 126 decides the desired motion such that the motion can be visually recognized as being continuous over time when the result of the key manipulation requires a change of the reproduced animation. For example, if a user instructs, by means of the key manipulation, the animation reproduction unit 120 to reproduce the animation b2 while the animation b1 is being reproduced, the animation reproduction unit 120 sequentially changes the proportions between the running and walking figures in order to gradually change the motion of the model from the running figure to the walking figure. For example, the motion decision unit 126 may decide the blending proportions between the running and walking figures to be sequentially changed in the following order: (100%:0%)→(90%:10%)→(70%:30%)→(50%:50%)→(30%:70%)→(10%:90%)→(0%:100%).

When there is no key manipulation, or when the key manipulation does not require a change of the reproduced animation, for example, as in a pause or a restart, the motion determination unit 126 may determine that the motion of a currently-reproduced animation is appropriate or no operation is necessary.

The motion decision unit 126 notifies the search unit 128, which will be described below, about the decided motion. At the same time, the motion decision unit 126 may also notify the blending unit 134, which will be described below, about the decided motion.

The search unit 128 searches the storage unit 124 for at least one animation corresponding to the desired motion. For example, if blending proportions between the running and the walking of the decided motion are 70%:30%, the search unit 128 searches the storage unit 124 for the animations b1 and b2. If the determined motion is the walking motion, the search unit 128 searches the storage unit 124 for the animation b2. The search unit 128 includes an inspection unit 130 and a reading unit 132. Operations of the search unit 128 will be described hereinafter in more detail.

The inspection unit 130 inspects whether or not the animation stored in the storage unit 124 corresponds to the decided motion. The animations stored in the storage unit 124 may be preferably managed using a least-recently used (LRU) method. In other words, the inspection unit 130 inspects the least-recently used animation in advance. Alternatively, the animations stored in the storage unit 124 may be managed using a most-recently used (MRU) method. In other words, the inspection unit 130 may inspect the most recently searched animation in advance.

If the inspection determines that there is a stored animation corresponding to the decided motion, the inspection unit 130 generates and outputs a reading-out control signal. The reading unit 132 reads the stored animation corresponding to the decided motion from the storage unit 124 and outputs the read animation as a searched animation in response to the reading-out control signal.

When the inspection as to whether or not there is any animation corresponding to the decided motion in the storage unit 124 is completed for all of the stored animations, the inspection unit 130 inspects whether or not there is any animation which corresponds to the decided motion and is not included in one or more of the searched animations.

If it is inspected that there is an additional animation which corresponds to the decided motion and is not included in the searched animations, the inspection unit 130 generates and outputs a restoration control signal. In this case, the restoration unit 132 operates in response to the restoration control signal. That is, the restoration unit 132 performs restoration for the compressed animations that have been input from the compression unit 112 but have not yet been restored, in response to the restoration control signal.

The motion blending unit 134 operates when a user instructs, by means of key manipulation, that the reproducing animation is to be changed. In this case, the motion blending unit 134 blends one or more searched animations according to the decided motion. Specifically, the motion blending unit 134 multiplies each of one or more searched animations by a weight value corresponding to the decided motion, and adds the results of the multiplications.

Figure 3:
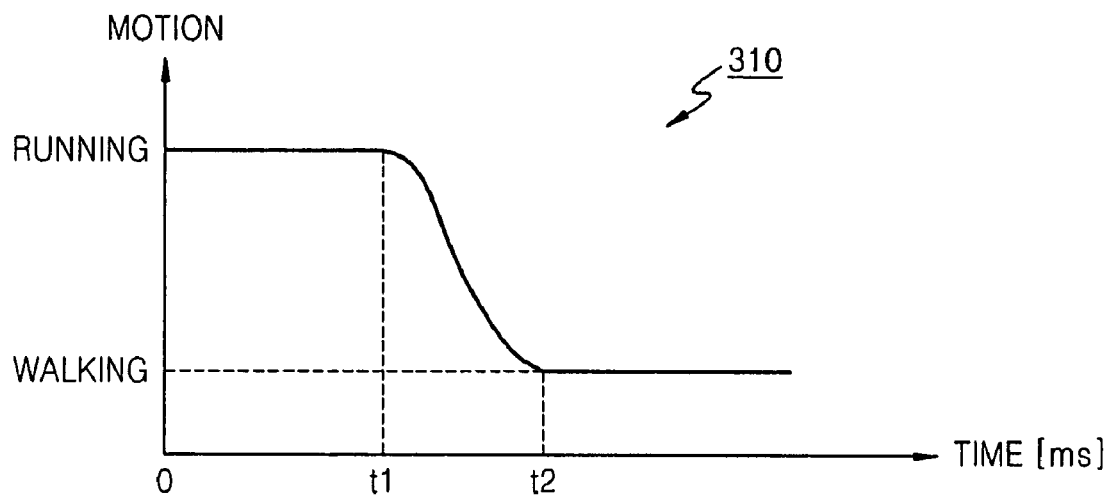
FIG. 3 is a schematic diagram for describing operations of the motion blending unit illustrated in FIG. 1.

FIG. 3 is a schematic diagram for describing operations of the motion blending unit 134 of FIG. 1. Referring to FIG. 3, a user instructs, by means of key manipulation, that the animation b2 be reproduced at a time point t1. The animation reproduction unit 120 does not start to reproduce the animation b2 from a time point t1 (t=t1) but starts to reproduce the animation b2 from a time point t2 (t=t2, where t2>t1). The motion blending unit 134 generates an additional animation by blending the animations b1 and b2 by predetermined proportions during a time period t1<t<t2. For example, the motion blending unit 134 may generate the additional animation using a formula b1×1.0+b2×0.0 at a point of time ta (t=ta), using a formula b1*0.9+b2*0 at a point of time tb (t=tb), using a formula b1*0.7+b2*0.3 at a point of time tc (t=tc), using a formula b1*0.5+b2*0.5 at a point of time (t–td), using a formula b1*0.3+b2*0.7 at a point of time te (t=te), using a formula b1*0.1+b2*0.9 at a point of time tf (t=tf), and using a formula b1*0.0+b2*1.0 at a point of time tg (t=tg), where t1<ta<tb<tc<td<te<tf<tg<t2.

The animation supply unit 136 receives the result of the blending from the blending unit 134 after the motion blending unit 134 operates. Similarly, the animation supply unit 136 receives the searched animation from the reading unit 132 when the blending unit 134 does not operate.

The animation supply unit 136 supplies the received animation to the rendering unit 138. In this case, the received animation may be the result of the blending or of the searched animation. The rendering unit 138 renders the animation supplied from the animation supply unit 136. Here, the rendering refers to a type of visualization.

The display unit 140 displays the result of the rendering. A liquid crystal display (LCD) may be implemented as the display unit 140, for example.

Figure 4:
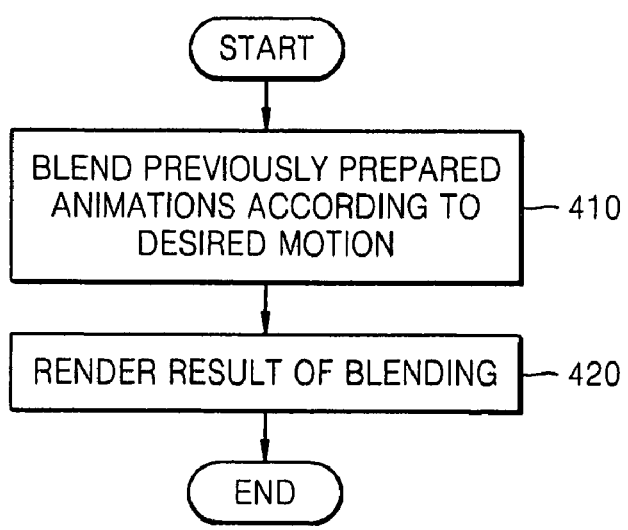
FIG. 4 is a flowchart illustrating an animation reproducing method according to an embodiment of the present invention.

FIG. 4 is a flowchart for describing an animation reproducing method according to an embodiment of the present invention, which includes operations 410 to 420 of generating and reproducing an animation corresponding to a desired motion by blending one or more previously-provided animations according to the desired motion even when the animation representing the desired motion is not previously provided.

The motion blending unit 134 blends one or more of the previously-provided animations according to the desired motion to be displayed on the display unit 140 (operation 410). In this case, a previously-provided animation is an animation created in the authoring unit 110. More specifically, the previously-provided animation is an animation searched for by the search unit 128 as a desired animation corresponding to the motion to be displayed.

After operation 410, the rendering unit 138 renders the result of the blending performed in operation 410 and displays the result of the rendering (operation 420).

Figure 5:
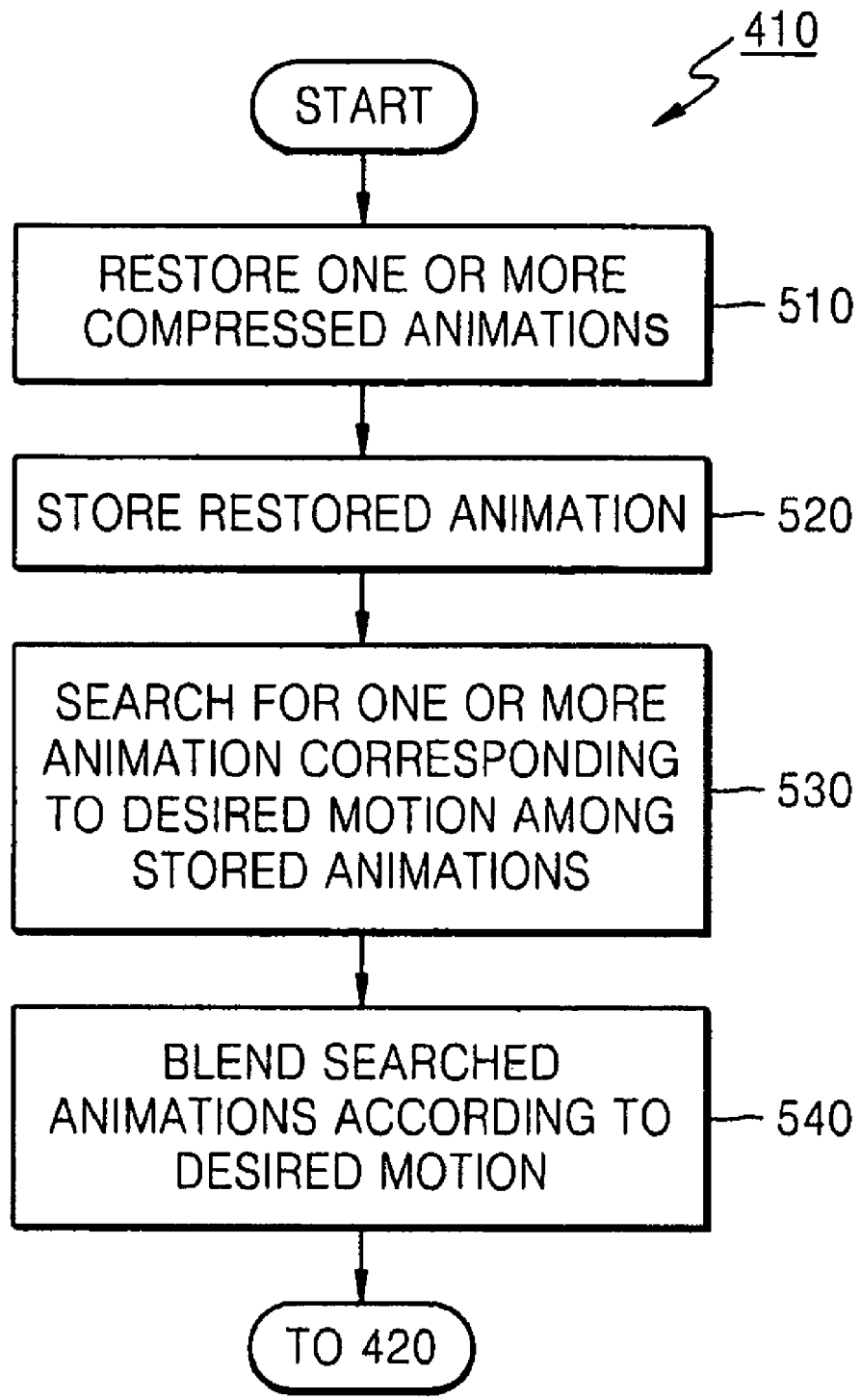
FIG. 5 is a flowchart for describing another example of the operation described in FIG. 4 according to an embodiment of the present invention.

FIG. 5 is a flowchart for describing operation 410 illustrated in FIG. 4 according to an embodiment of the present invention, which includes operations 510 to 540 for blending one or more of the previously created animations according to a desired motion.

The restoration unit 122 restores one or more compressed animations (operation 510), and the storage unit 124 stores the animations restored in operation 510 (operation 520).

The search unit 128 searches for one or more animations corresponding to a desired motion that is to be displayed, among the animations stored in operation 520 (operation 530).

After operation 530, the motion blending unit 134 blends one or more animations searched for in operation 530 according to the desired motion that is to be displayed (operation 540).

Figure 6:
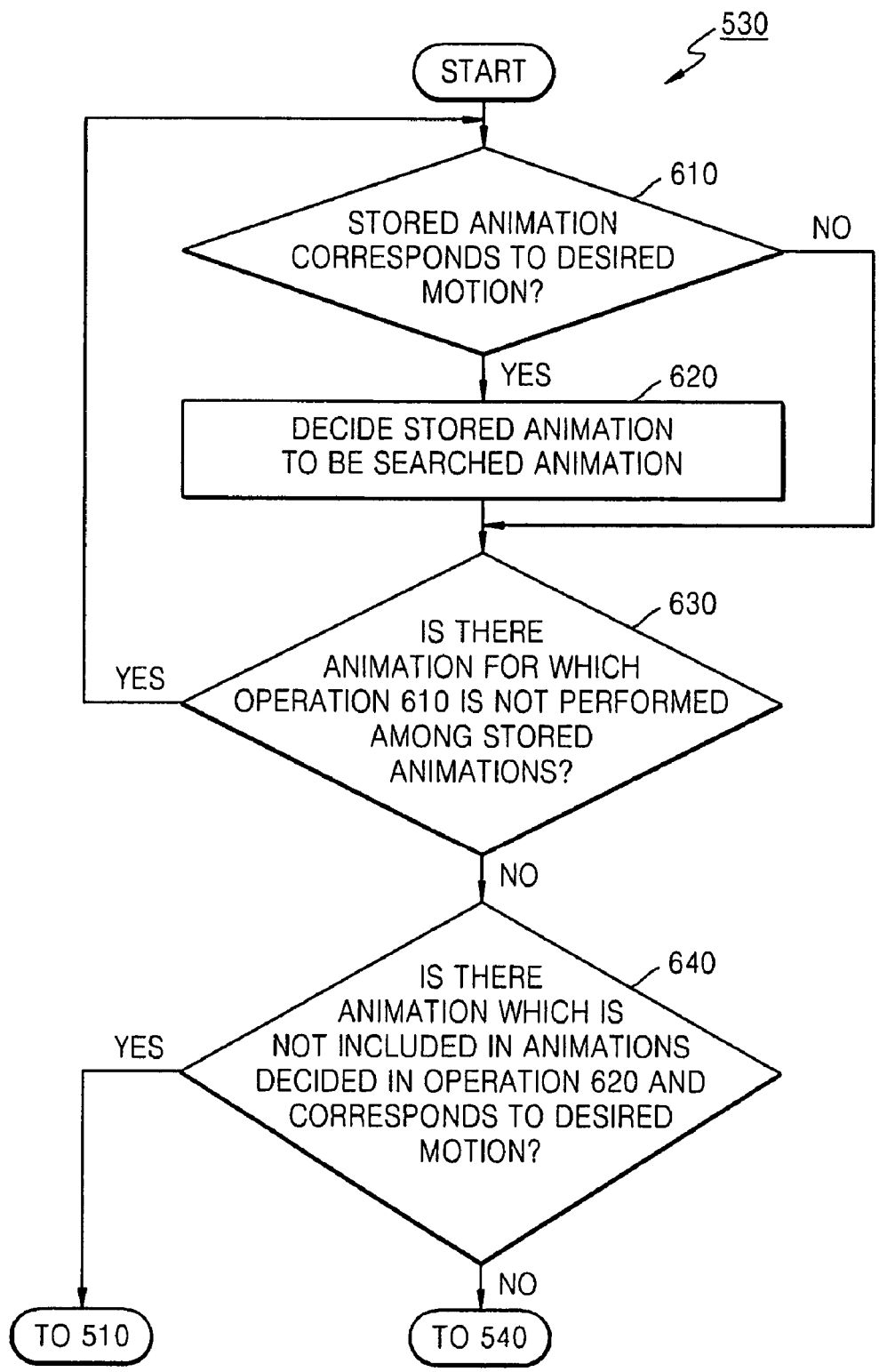
FIG. 6 is a flowchart for describing another example of the operation described in FIG. 5 according to an embodiment of the present invention.

FIG. 6 is a flowchart for describing operation 530 illustrated in FIG. 5 according to an embodiment of the present invention, which includes operations 610 to 630 of searching for the animation corresponding to the desired motion among the animations stored in operation 520, and operation 640 of determining whether or not there is an animation which corresponds to the desired motion and is not included in the searched animations.

The inspection unit 130 determines whether the animation stored in operation 520 corresponds to the desired motion (operation 610).

If it is determined that the animation stored in operation 520 corresponds to the desired motion in operation 610, the reading unit 132 determines the stored animation to be the searched animation.

After operation 620, the inspection unit 130 determines whether there is an animation for which operation 610 is not performed among the animations stored in operation 620 (operation 630). Operation 630 may be performed after operation 620 is performed, as illustrated in FIG. 6. Alternatively, operation 630 may be performed before operation 620 or simultaneously with operation 620.

Meanwhile, if it is determined that the animation stored in operation 520 does not correspond to the desired motion in operation 610, the process proceeds to operation 630.

If it is determined that there is an animation for which operation 610 is not performed in operation 630, the process proceeds to operation 610.

If it is determined that there is no animation for which operation 610 is not performed in operation 630, the inspection unit 130 determines whether there is an animation which is not included in one or more animations determined in operation 620 and corresponds to the desired motion to be displayed (operation 640).

If it is determined that there is an animation which is not included in one or more animations determined in operation 620 and corresponds to the desired motion, the process proceeds to operation 510. If it is determined that there is no animation which is not included in one or more animations determined in operation 620 and corresponds to the desired motion, the process proceeds to operation 540.

The invention can also be embodied as computer-readable codes on a computer-readable recording medium executable by a computer. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

As described above, in the animation reproducing apparatus and method according to an embodiment of the present invention, an animation representing a desired motion is generated and reproduced by blending one or more previously-provided animations according to the desired motion even when an animation corresponding to a desired motion is not previously provided. Therefore, it is possible to reproduce even a new motion which does not exist among the motions expressed by one or more previously-provided animations. As a result, an animation reproducing method and apparatus according to the present invention can enable the desired motion to be realistically and naturally reproduced by changing the reproduced motion until it becomes a different motion even when the desired motion is entirely different from the currently reproduced motion. Meanwhile, in the animation reproducing apparatus and method according to an embodiment of the present invention, since even a compressed animation can be restored and reproduced in a real-time manner, it is possible to reduce a burden on a storage space which is necessary for the previously provided animations. Furthermore, in the animation reproducing apparatus and method according to an embodiment of the present invention, since the restored animation can be temporarily stored, the stored animation can be reproduced promptly.

While the present invention has been particularly shown and described with reference to embodiments thereof, it will be understood by those skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An animation reproducing apparatus for reproducing an animation of a predetermined model, the animation reproducing apparatus comprising:
    a restoration unit restoring at least one compressed animation;
    a storage unit storing at least one of the restored animations;
    a motion blending unit blending at least two previously prepared animations by using vertexes shared by the at least two previously prepared animations and included in each of the previously prepared animations according to a desired motion that is to be reproduced;
    a rendering unit rendering a result of the blending; and
    a display unit displaying the result of the rendering,
    wherein the previously prepared animation is the stored animation in the storage unit if a stored animation corresponding to the desired motion is included in the storage unit, or the previously prepared animation is the animation restored by the restoration unit if a stored animation corresponding to the desired motion is not included in the storage unit.

2. The animation reproducing apparatus of claim 1, wherein the motion blending unit multiplies a weighted, value corresponding to the desired motion by each of one or more previously prepared animations and adds results of the multiplications, and
    wherein the rendering unit renders a result of the addition.

3. The animation reproducing apparatus of claim 1, further comprising a search unit searching for at least one animation corresponding to the desired motion among the stored animations,
    wherein the motion blending unit blends one or more of the searched animations according to the desired motion.

4. The animation reproducing apparatus of claim 3, wherein the search unit includes:
    an inspection unit inspecting whether the stored animation corresponds to the desired motion and generating a reading control signal in response to a result of the inspection; and
    a reading unit outputting the inspected animation as a searched animation in response to the reading control signal,
    wherein the inspection unit inspects the stored animation on a most-recently-searched basis.

5. The animation reproducing apparatus of claim 4, wherein the inspection unit inspects whether there is an animation which corresponds to the desired motion and is not included in the searched animations and generates a restoration control signal in response to a result of the inspection of whether there is an animation which corresponds to the desired motion and is not included in the searched animations, and
    wherein the restoration unit operates in response to the restoration control signal.

6. The animation reproducing apparatus of claim 1, wherein the desired motion displayed based on a result of the rendering is visually displayed in a continuous manner over time.

7. The animation reproducing apparatus of claim 1, wherein the animation is one of a rigid body animation, a skin and bone animation, and a morphing animation.

8. An animation reproducing method for reproducing an animation of a predetermined model, the animation reproducing method comprising:
    using a computing device to perform:
    restoring at least one compressed animation;
    storing at least one of the restored animation;
    blending at least two previously prepared animations by using vertexes shared by the at least two previously prepared animations and included in each of the previously prepared animations according to a desired motion that is to be reproduced; and
    rendering a result of the blending,
    wherein the previously prepared animation is the stored animation if it is determined that there is a stored animation corresponding to the desired motion, or the previously prepared animation is the restored animation if it is determined that there is no stored animation corresponding to the desired motion.

9. The animation reproducing method of claim 8, wherein the blending of the previously prepared animations comprises:
    multiplying a weighted value corresponding to the desired motion by each of one or more of the previously prepared animations; and
    adding results of the multiplications,
    wherein a result of the addition is rendered.

10. The animation reproducing method of claim 8, wherein the blending of the previously prepared animations includes:
    searching for at least one animation corresponding to the desired motion among the stored animations; and
    blending one or more of the searched animations according to the desired motion.

11. The animation reproducing method of claim 10, wherein the searching for at least one animation corresponding to the desired motion comprises:
    determining whether one of the stored animations corresponds to the desired motion; and
    deciding one of the stored animations to be a searched animation if it is determined that one of the stored animations corresponds to the desired motion,
    wherein the determining whether one of the stored animation corresponds to the desired motion is performed on a most-recently-searched basis.

12. The animation reproducing method of claim 11, wherein the searching for at least one animation corresponding to the desired motion further comprises:
    determining whether there is an animation which is not included in the decided searched animations and corresponds to the desired motion; and returning to restoring at least one compressed animation if it is determined that there is an animation which is not included in the decided searched animations and corresponds to the desired motion.

13. The animation reproducing method of claim 8, further comprising displaying a result of the rendering.

14. The animation reproducing method of claim 8, wherein the desired motion represented by the displayed result of the rendering is visually displayed in a continuous manner over time.

15. The animation reproducing method of claim 8, wherein the animation is one of a rigid body animation, a skin and bone animation, and a morphing animation.

16. A non-transitory computer-readable medium having embodied thereon a computer program for causing a computer to execute an animation reproducing method for reproducing an animation of a predetermined model, the animation reproducing method comprising:
   restoring at least one compressed animation;
   storing at least one of the restored animation;
   blending at least two previously prepared animations by using vertexes shared by the at least two previously prepared animations and included in each of the previously prepared animations according to a desired motion; and
   rendering a result of the blending,
   wherein the previously prepared animation is the stored animation if it is determined that there is a stored animation corresponding to the desired motion, or the previously prepared animation is the restored animation if it is determined that there is no stored animation corresponding to the desired motion.

17. The animation reproducing apparatus of claim 1, wherein the motion blending unit blends one or more previously prepared animations considering a weighted value corresponding to the desired motion in each of one or more previously prepared animations.

18. The animation reproducing method of claim 8, wherein, in the blending of the previously prepared animations, one or more previously prepared animations are blended considering a weighted value corresponding to the desired motion in each of one or more previously prepared animations.

19. An animation reproducing apparatus for reproducing an animation of a predetermined model, the animation reproducing apparatus comprising:
   a restoration unit restoring at least one compressed animation;
   a storage unit storing at least one of the restored animations;
   a motion blending unit blending at least two previously prepared animations by producing at least one intermediate animation between a first previously prepared animation and a second previously prepared animation based on a time-varying proportion between the first animation and the second animation by using vertexes shared by each of the at least two previously prepared animations and included in the previously prepared animations according to a desired motion that is to be reproduced;
   a rendering unit rendering a result of the blending; and
   a display unit displaying the result of the rendering,
   wherein the previously prepared animation is the stored animation in the storage unit if a stored animation corresponding to the desired motion is included in the storage unit, or the previously prepared animation is the animation restored by the restoration unit if a stored animation corresponding to the desired motion is not included in the storage unit.

* * * * *